US012230436B2

(12) United States Patent
Yao et al.

(10) Patent No.: US 12,230,436 B2
(45) Date of Patent: Feb. 18, 2025

(54) SPACER TO REDUCE MAGNETIC COUPLING

(71) Applicant: International Business Machines Corporation, Armonk, NY (US)

(72) Inventors: Yuan Yao, Tarrytown, NY (US); Todd Edward Takken, Brewster, NY (US); Xin Zhang, Chappaqua, NY (US); Andrew Ferencz, Southborough, MA (US); Shurong Tian, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 17/104,173

(22) Filed: Nov. 25, 2020

(65) Prior Publication Data

US 2022/0165488 A1 May 26, 2022

(51) Int. Cl.

| | |
|---|---|
| ***H01F 27/24*** | (2006.01) |
| ***H01F 27/06*** | (2006.01) |
| ***H01F 27/28*** | (2006.01) |
| ***H01F 27/34*** | (2006.01) |

(52) U.S. Cl.

CPC ............. *H01F 27/34* (2013.01); *H01F 27/06* (2013.01); *H01F 27/24* (2013.01); *H01F 27/2804* (2013.01); *H01F 2027/065* (2013.01); *H01F 2027/348* (2013.01)

(58) Field of Classification Search

CPC .......... H01F 27/34; H01F 27/06; H01F 27/24; H01F 27/2804; H01F 2027/065; H01F 2027/348; H01F 3/14; H01F 2027/2819

See application file for complete search history.

(56) References Cited

U.S. PATENT DOCUMENTS

| | | | | |
|---|---|---|---|---|
| 6,565,382 | B1 * | 5/2003 | Blodgett | H01F 27/263 336/200 |
| 7,141,883 | B2 | 11/2006 | Wei | |
| 9,607,759 | B2 * | 3/2017 | Boone | H01F 41/005 |
| 9,793,042 | B2 | 10/2017 | Scholz | |
| 9,941,565 | B2 | 4/2018 | Mcloughlin | |
| 10,204,732 | B2 | 2/2019 | Murphy | |
| 10,355,528 | B2 | 7/2019 | Borin | |

(Continued)

FOREIGN PATENT DOCUMENTS

WO WO-2010026690 A1 * 3/2010 ............. H01F 27/06

OTHER PUBLICATIONS

Chen et al., “A Fully PCB Integrated Self-Powered Micro Generator for Vibration Electromagnetic Harvesting”, IEEE Applied Power Electronics Conference and Exposition (APEC), 2020, pp. 3594-3599.

*Primary Examiner* — Mang Tin Bik Lian
(74) *Attorney, Agent, or Firm* — Aaron N. Pontikos

(57) ABSTRACT

An approach for reducing unwanted magnetic coupling with conductive elements by keeping the localized magnetic field in a transformer's or inductors magnetic gap far away from any conductive elements is provided. The approach includes the use of spacers to keep the localized magnetic field in a transformer's or inductor's magnetic gap far away from any conductive elements to reduce unwanted magnetic coupling with those conductive elements. The spacers can be made from materials including ferrite, conductors and non-conducting elements.

8 Claims, 8 Drawing Sheets

(56) References Cited

U.S. PATENT DOCUMENTS

| | | | | |
|---|---|---|---|---|
| 10,418,337 | B2 | 9/2019 | Zheng | |
| 2004/0080978 | A1* | 4/2004 | Jitaru | H01F 27/36 365/173 |
| 2004/0222478 | A1 | 11/2004 | Zhang | |
| 2011/0102121 | A1* | 5/2011 | Otsuka | H01F 27/06 336/200 |
| 2013/0207767 | A1* | 8/2013 | Worthington | H01F 27/363 336/84 C |
| 2016/0118177 | A1* | 4/2016 | Xu | H01F 3/10 336/200 |
| 2018/0172733 | A1* | 6/2018 | Wu | H01F 3/14 |
| 2019/0019618 | A1* | 1/2019 | Fukui | H05K 1/165 |
| 2019/0103212 | A1* | 4/2019 | Fujii | H01F 30/10 |

* cited by examiner

SPACER TO REDUCE MAGNETIC COUPLING

This invention was made with government support under B621073 awarded by Department of Energy. The government has certain rights to this invention.

BACKGROUND OF THE INVENTION

The present invention relates generally to the field of magnetic devices and more particularly to reducing unwanted magnetic coupling.

Magnetic gaps are often used in magnetic devices like transformers and inductors to set the reluctance of a magnetic circuit. Magnetic fringing fields can extend from the gap and induce eddy current in adjacent conductors, thereby creating loss. If any conductor is too close to a magnetic gap, it can introduce extra loss.

SUMMARY

According to an embodiment, an apparatus for controlling the distance of magnetic gaps between magnetic devices is disclosed: an upper construct, wherein a lower surface of the upper construct is coupled to an upper surface of a lower construct; a middle construct disposed between the upper construct and the lower construct and coupled to the lower construct; one or more magnetic gaps created by one or more magnetic devices and one or more conductors, wherein the one or more magnetic gaps is located between the bottom surface of the upper construct and the top surface of the lower construct; a predetermine optimal distance created between the one or more magnetic gaps to the top surface of the middle construct; and one or more spacers with a top surface adjacent and coupled to the bottom surface of the upper construct and a bottom surface of the one or more spacers is adjacent and coupled to the top surface of the middle construct.

According to another embodiment, an apparatus for controlling the distance of magnetic gaps between magnetic devices is disclosed: an upper construct with a top surface and a bottom surface, wherein the bottom surface of the upper construct is adjacent and coupled to a top surface of a middle construct; the middle construct is adjacent and coupled to a top surface of a lower construct; one or more magnetic gaps created by one or more magnetic devices and one or more conductors, wherein the one or more magnetic gaps is located between the bottom surface of the upper construct and the top surface of the lower construct; a predetermine optimal distance created between the one or more magnetic gaps to the top surface of the middle construct; and one or more spacers protruding from the bottom surface of the upper construct, wherein a bottom surface of the one or more spacers is adjacent and coupled to the top surface of the middle construct.

DETAILED DESCRIPTION

Embodiments of the present invention recognize improvements in reducing unwanted magnetic coupling with conductive elements by keeping the localized magnetic field in a transformer's or inductor's magnetic gap far away from any conductive elements. The improvements includes the use of a spacer to keep the localized magnetic field in a transformer's or inductor's magnetic gap far away from any conductive elements to reduce unwanted magnetic coupling with those conductive elements. For example, in an electric device such as a DC-DC converter, an inductor along with myriad of other electronic components are used to converter a certain DC voltage to another DC voltage. Not all incoming voltage is efficiently converted since a portion is wasted as heat. By using the embodiment in a DC-DC converter device, an improvement in conversion efficiency of 92.5% (i.e., 48-54 Voltage converter) can be achieved. Another advantage of using spacers is the reduction in electronic component size since the reduced magnetic field allows for less interference between the component and adjacent conductors.

Figure 1A:
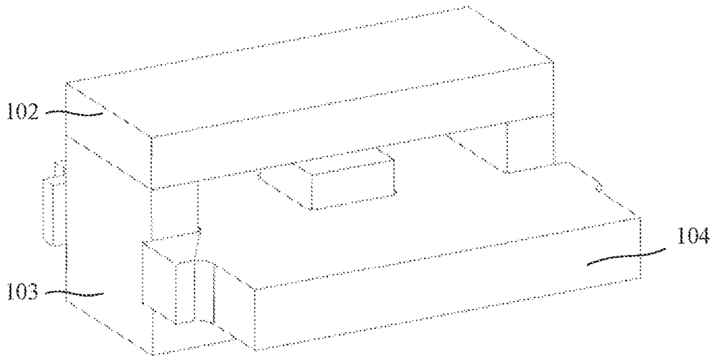
FIG. 1A (Prior Art)
FIGS. 1A, 1B and 1C illustrate the current state of art by showing various components of a magnetic device, in accordance with an embodiment of the present invention.
Figure 1B:
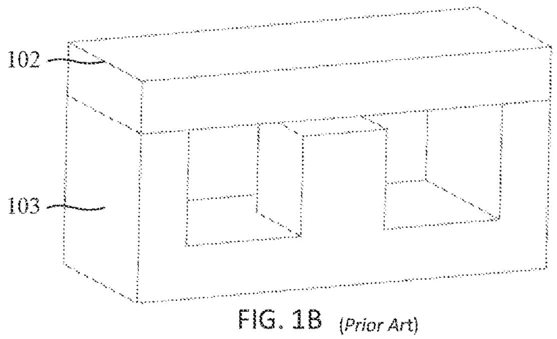
FIG. 1B (Prior Art)
Figure 1C:
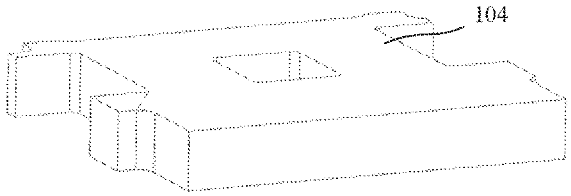
FIG. 1C (Prior Art)
Figure 1D:
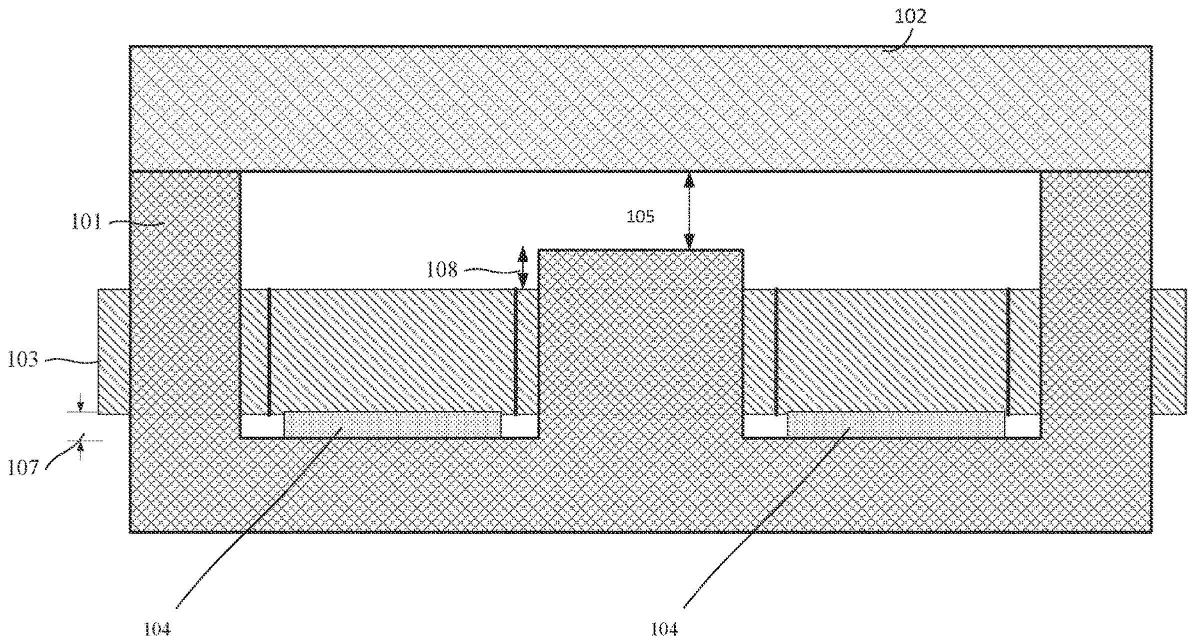
FIG. 1D (Prior Art)
FIG. 1D illustrates (a cross section view) the current state of art using an adhesive material to reduce the magnetic field created by a magnetic gap formed between an E-core ferrite and an I-core ferrite, in accordance with one embodiment of the present invention.

FIGS. 1A, 1B and 1C illustrates the current state of art by showing various components of a magnetic device, wherein a magnetic gap is formed between an E-core ferrite and an I-core ferrite, in accordance with an embodiment of the present invention;

FIG. 1D illustrates the current state of art by showing a cross section view of a magnetic device of FIGS. 1A, 1B and 1C, wherein a magnetic gap (105) is formed between an E-core ferrite (101) and an I-core ferrite (102). An adhesive material (104) is used to attach the E-core ferrite (101) to the PCB (103), and thereby enforce a minimum distance from the magnetic gaps (105) to the adjacent copper conductors in the PCB (printed circuit board). In addition, there is a predetermined distance between the bottom of I-core ferrite (102) to the top of PCB (103) labeled as top PCB air gap 108. There is another distance between the bottom of PCB (103) to the E-core ferrite (101) labeled as bottom PCB air gap 107. Top PCB air gap 108 is the optimal distance from magnetic gap (105) and the optimal distance will be roughly proportional to the physical gap size. For example, if the vertical distance of magnetic gap (105) is G, then the distance A (i.e., top PCB air gap 108) to the nearest piece of conducting or magnetic material should be some constant C multiplied by distance G (i.e., A=C×G).

Bottom PCB air gap 107 is an air space that has been intentionally created as a physical "buffer" due to variation in PCB thickness. Due to the lack of manufacturing tolerance, the thickness of PCB has a 10% or even 20% variation. Without bottom PCB air gap 107, the PCB may not fit when it's thicker than nominal. Another advantage of having bottom PCB air gap 107 is that it allows for other devices that can are designed to be mounted on the PCB to be much smaller. In another application wherein the PCB is mounted vertically between I-core ferrite (102) and E-core ferrite (101), having top PCB air gap 108 and bottom PCB air gap 107 can help balance the overall device's center of mass over its base of support.

The device shown in this figure is a traditional design with the magnetic gap located between the I-core and the center post of the E-core. The magnetic gaps could also be located between the I-core and the outer posts of the E-core.

Embodiments of the present invention will now be described in detail with reference to the accompanying figures. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, and elements and features can have different dimensions than those depicted in the figures. Therefore, specific structural and functional details disclosed herein are not to be interpreted as limiting, but merely as a representative basis for teaching one skilled in the art to variously employ the present invention.

References in the specification to "an exemplary embodiment," and "other embodiments," etc., indicate that the embodiment described may include a particular feature, structure or characteristic, but every embodiment may not necessarily include the particular feature, structure or characteristic. Further, when a particular feature, structure, or characteristic is described in connection with an embodiment, it is submitted that it is within the knowledge of one skilled in the art to affect such feature, structure or characteristic in connection with other embodiments whether or not specifically described.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

The term "construct", along with its derivatives, may be used herein. "Construct" may mean the following. "Construct" may mean a one or more elements making up a substance such as in a layer of substrate.

The purpose of the spacer is to reduce magnetic coupling between a magnetic structure and any nearby conducting elements. There can be many different methods to reduce magnetic coupling, such as the use of a Faraday cage-like conductive. However, the use of such cage would not wholly address the deficiency (i.e., reducing all current in conducting structures that might be near the magnetic field) with the current art. Furthermore, the use of circuit boards as the only primary mean to reduce magnetic coupling does not address all the deficiency with the current art. However, the use of PCB in conjunction with another construct to reduce the magnetic gap is feasible.

Overall, the primary use of a spacer is to keep a predetermined/optimal distance from the localized magnetic field to any adjacent conductive elements. The spacer is not part of the magnetic loop to enforce a minimum distance between the magnetic gap and adjacent conductors. The optimal distance from the magnetic gap will be roughly proportional to the physical gap size. Referring to FIG. 1D, the vertical height of magnetic gap 105 will roughly be proportional to the distance that the fringing fields spread out from that gap. The maximal magnetic field density across the gap will be roughly constant for a given magnetic material. Each magnetic material will have a saturation field. Above this field density, the magnetic material ceases to act like a magnetic material. Thus, person of ordinary skill in the art can design the device to operate somewhat below this maximum field density. As a practical rule, if the vertical distance magnetic gap 105 is G, then the distance A to the nearest piece of conducting or magnetic material should be some constant C multiplied by distance G (i.e., A=C×G). In the current application of the embodiment, when C=3, it was sufficient to give a low loss with some margin left over for assembly variation.

If the spacer is located far enough from the magnetic gap (i.e., high magnetic reluctance space), then it can be made from a variety of materials with a low magnetic reluctance material including, conductors (e.g., superconductors, semiconductors, plasmas, electrolytes, etc.), metals (e.g., copper, gold, iron, etc.) and soft ferrites (i.e., low coercively such as manganese-zinc ferrite or nickel-zinc ferrite). Otherwise, spacers can be made from non-conductors (e.g., insulators, ceramics, etc.). Magnetic reluctance (also known as reluctance, magnetic resistance, or a magnetic insulator) is defined as the opposition offered by a magnetic circuit to the production of magnetic flux. It is the property of the material that opposes the creation of magnetic flux in a magnetic circuit.

The embodiments (e.g., FIG. 2A, 2B and FIG. 3A, 3B) gives the flexibility to move the air space for PCB thickness tolerance from one side of the PCB to the other side. No wasted space is required to keep the magnetic gap away from conductors and the wasted space required for PCB tolerance can be balanced on different sides of the PCB. Depending on what other things need to be mounted on the PCB, this may allow the overall device size to be smaller. This may also help balance the device's center of mass over its base of support.

Figure 2A:
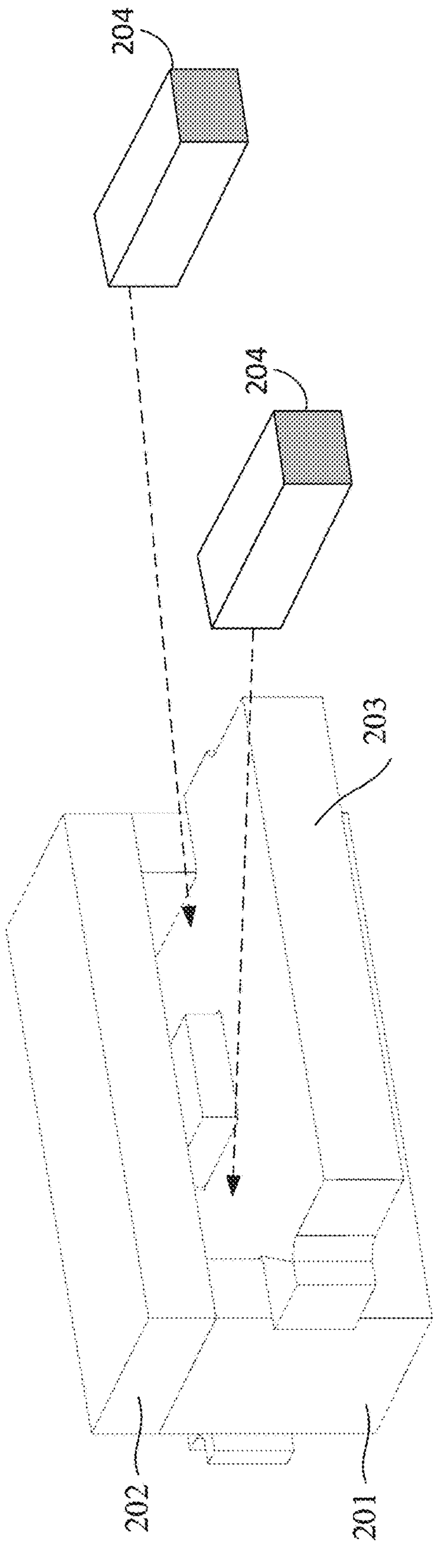
FIGS. 2A and 2B illustrate, in an exploded view, the use of a metal spacer on a magnetic device, in accordance with one embodiment of the present invention.
Figure 2B:
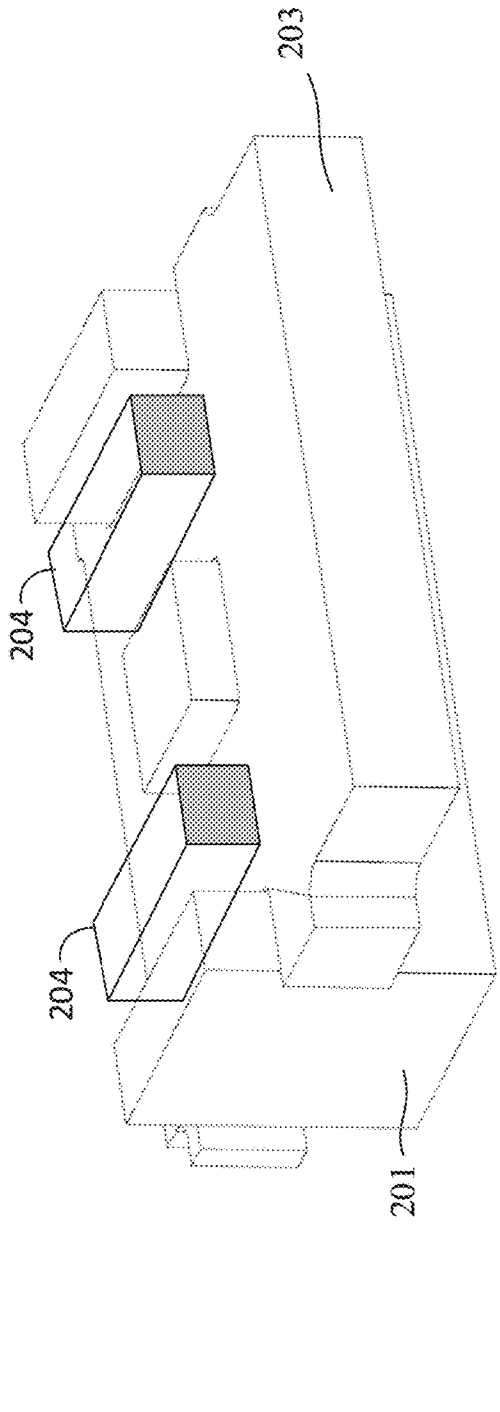

FIGS. 2A and 2B illustrates, in an exploded view, the use of a metal spacer on a magnetic device, wherein a magnetic gap is formed between an E-core ferrite and an I-core ferrite, in accordance with one embodiment of the present invention.

Figure 2C:
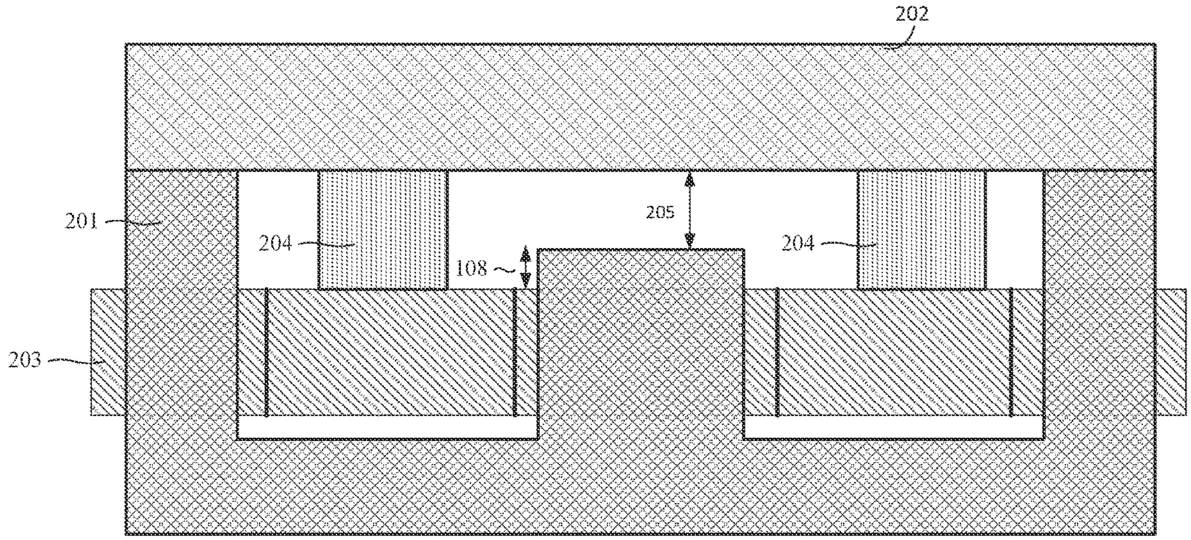
FIG. 2C illustrates (a cross section view) the use of a metal spacer on a magnetic device, wherein a magnetic gap is formed between an E-core ferrite and an I-core ferrite, in accordance with one embodiment of the present invention.
Figure 2D:
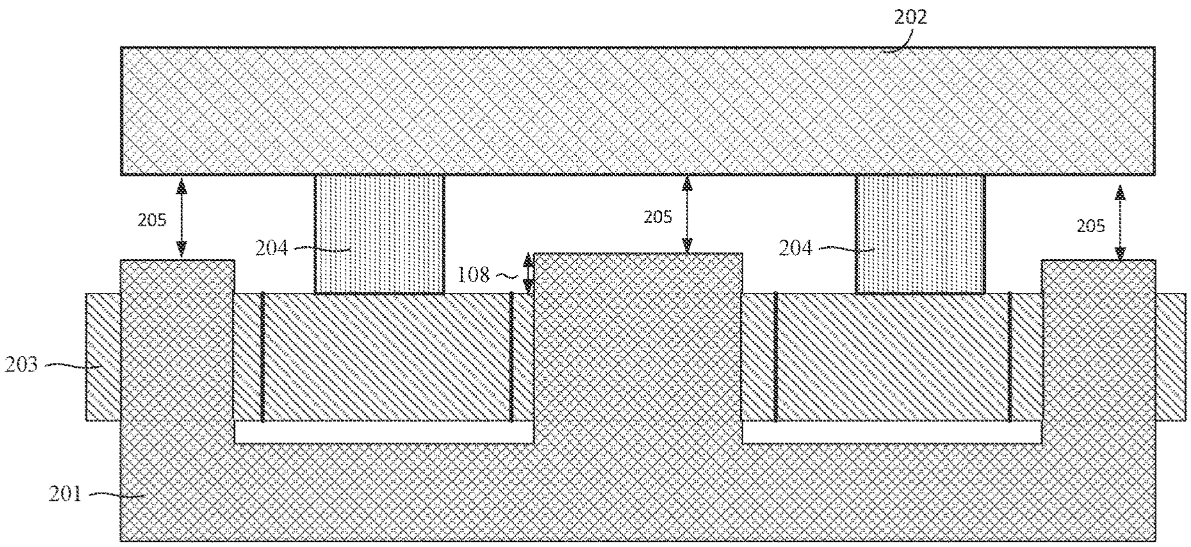
FIG. 2D illustrates (a cross section view) an alternative embodiment of FIG. 2C, wherein the magnetic gap is located between the outer post of the E-core ferrite and an I-core ferrite, in accordance with one embodiment of the present invention.

FIG. 2C shows cross section view of a magnetic device of FIGS. 2A and 2B, wherein a magnetic gap (205) is formed between two constructs, such as, an E-core ferrite (201) and an I-core ferrite (202). A metal spacer (204) is used to control the distance from the magnetic gaps (205) to the adjacent copper conductor in another construct, such as, a PCB (203). This example has the magnetic gap located between the I-core and the center post of the E-core. The magnetic gaps could also be located between the I-core and the outer posts of the E-core (see FIG. 2D).

It is noted that PCB (203) is mentioned as an example of structures that could contain such conducting elements. However, using PCB (203) exclusively to create a gap does not wholly address the issue of reducing magnetic coupling. There can be copper layers (not shown) and layers of FR4 (not shown) coupled with the PCB (203) construct. FR4 substrate is a NEMA grade glass-reinforced exposit laminate.

Figure 3A:
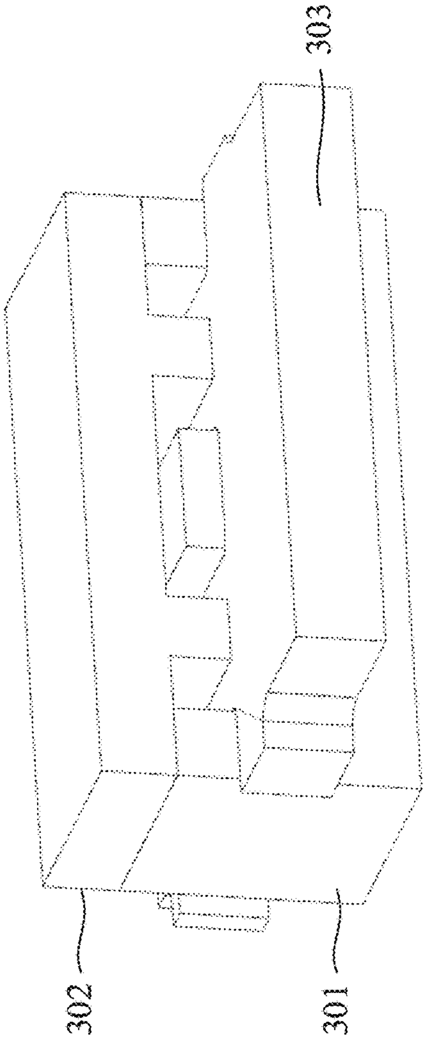
FIGS. 3A and 3B illustrate, in an exploded view, the use of bumps on of a magnetic device, in accordance with another embodiment of the present invention.
Figure 3B:
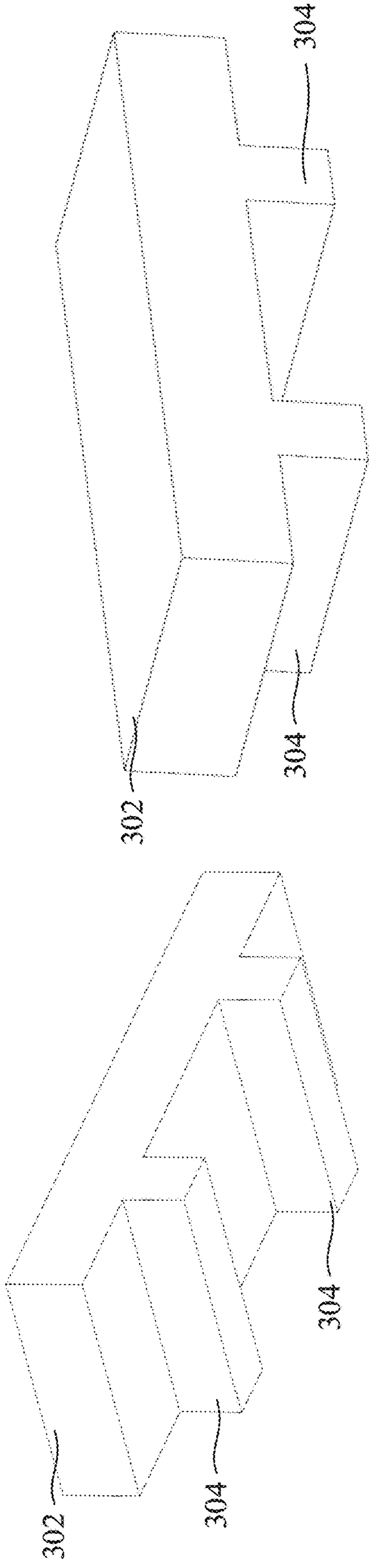

FIGS. 3A and 3B illustrates, in an exploded view, the use of a spacer (304) protruding from the I-core ferrite (302) of a magnetic device, wherein a magnetic gap is formed between an E-core ferrite and an I-core ferrite, in accordance with one embodiment of the present invention.

Figure 3C:
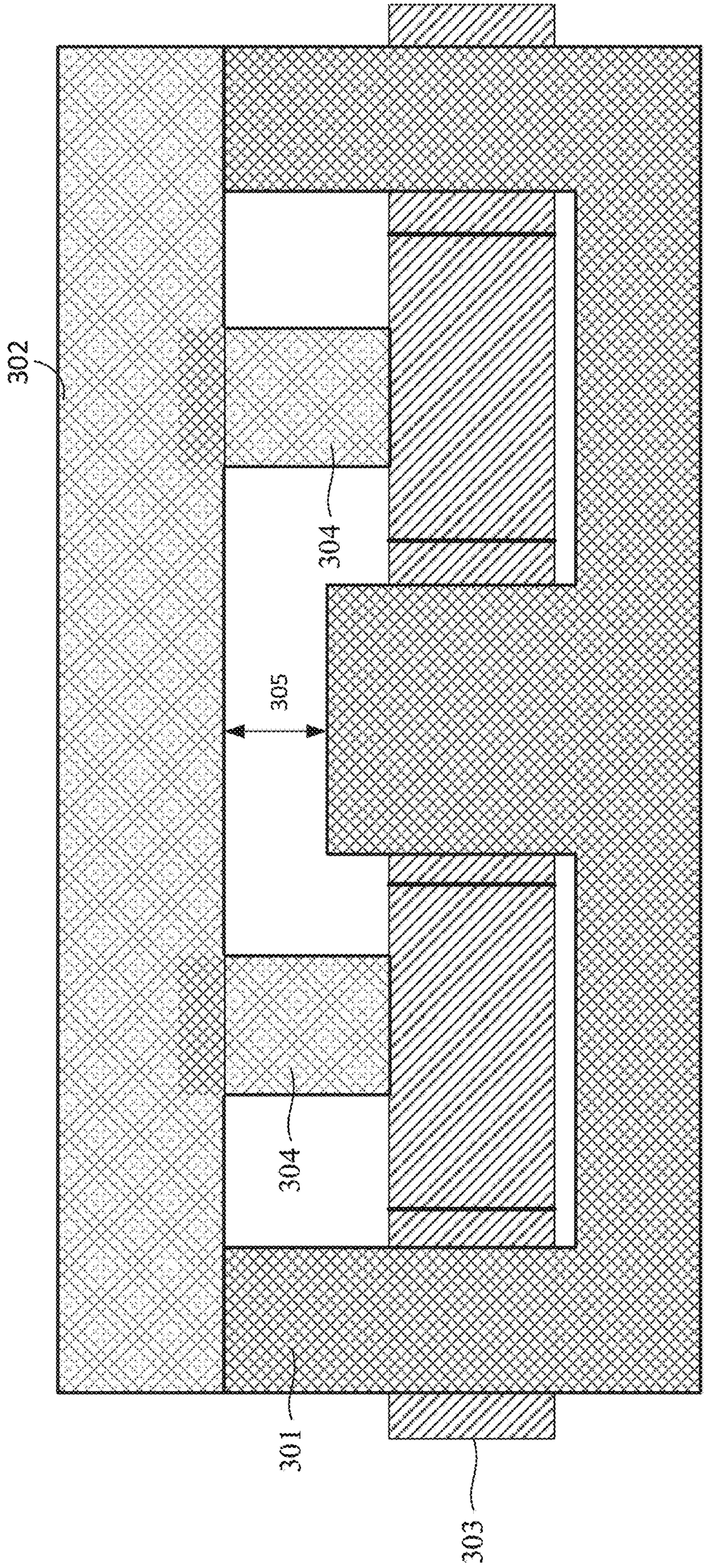
FIG. 3C illustrates (a cross section view) the use of bumps on of a magnetic device, wherein a magnetic gap is formed between an E-core ferrite and an I-core ferrite, in accordance with another embodiment of the present invention.
Figure 3D:
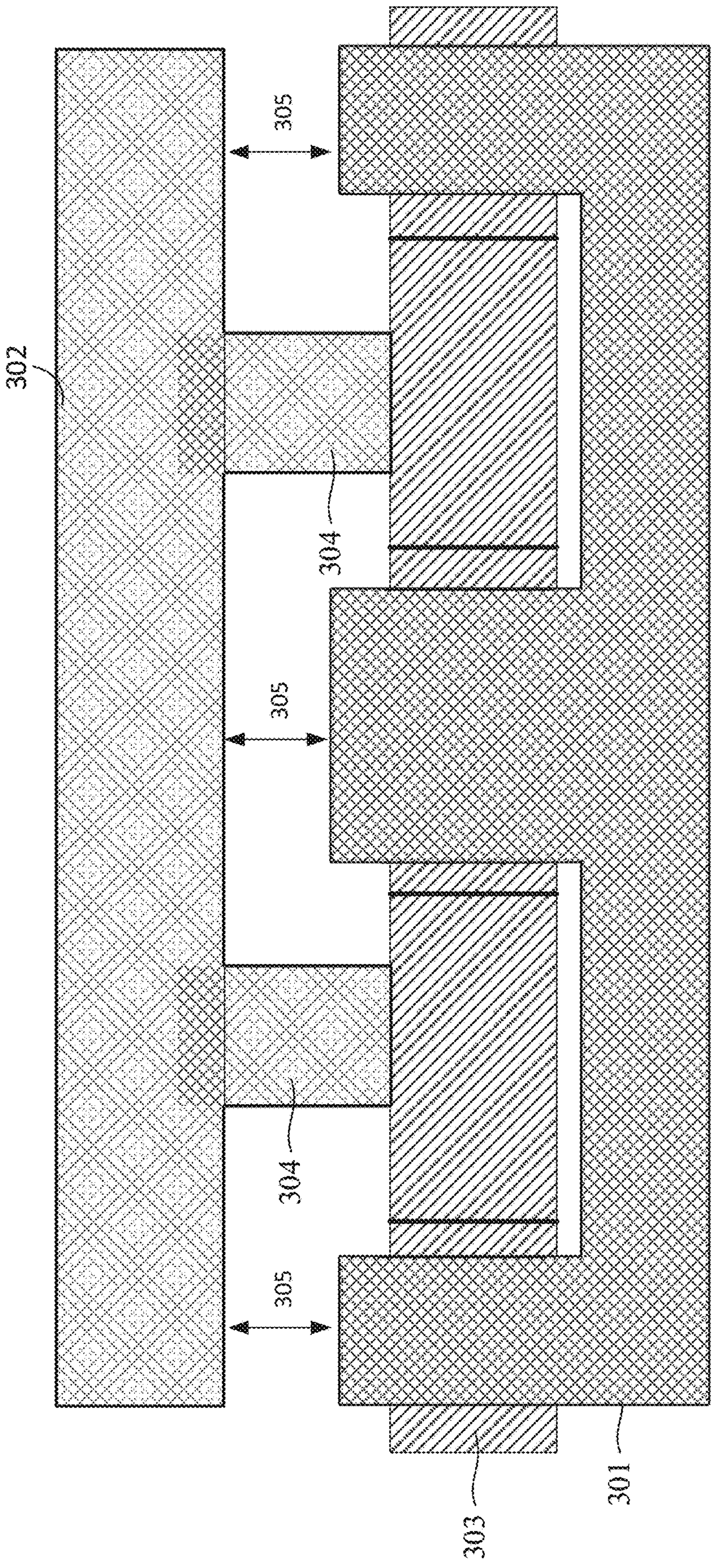
FIG. 3D illustrates (a cross section view) an alternative embodiment of FIG. 3C, wherein the magnetic gap is located between the outer post of the E-core ferrite and an I-core ferrite, in accordance with one embodiment of the present invention.

FIG. 3C shows cross section view of a magnetic device wherein a magnetic gap (305) is formed between two constructs, such as, an E-core ferrite (301) and an I-core ferrite (302). Two protruding bumps (i.e., same material as the I-core ferrite) on the I-core ferrite are used as spacers (204) to control the distance from the magnetic gap (305) to the adjacent copper conductor in another construct, such as, a PCB (303). This example has the magnetic gap located between the I-core and the center post of the E-core. The magnetic gaps could also be located between the I-core and the outer posts of the E-core (see FIG. 3D).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A magnetic device, comprising:

a lower magnetic construct comprising a center post located between a pair of outer posts;

an upper magnetic construct, coupled to the lower magnetic construct, such that a magnetic gap is formed between a bottom surface of the upper magnetic construct and at least a top surface of the center post of the lower magnetic construct, wherein the upper magnetic construct includes two or more spacers that protrude from the bottom surface of the upper magnetic construct, the two or more spacers formed from a same material as the upper magnetic construct; and a middle construct, comprising a plurality of conductive layers, disposed below the top surface of the center post of the lower magnetic construct, wherein a top surface of the middle construct is coupled to a bottom surface of the two or more spacers protruding from the bottom surface of the upper magnetic construct, and wherein the two or more spacers are used to control a distance of the top surface of the middle construct from the top surface of the center post of the lower magnetic construct.

2. The magnetic device of claim 1, wherein the middle construct further comprises a PCB (Printed Circuit Board).

3. The magnetic device of claim 1, wherein the magnetic gap further comprises a high magnetic reluctance space between the upper magnetic construct and the lower magnetic construct.

4. The magnetic device of claim 1, wherein the two or more spacers are not present in respective regions that are part of a functional magnetic flux loop created by the magnetic device and the plurality of conductive layers.

5. The magnetic device of claim 1, wherein the upper magnetic construct and the lower magnetic construct each include a low magnetic reluctance material.

6. The magnetic device of claim 1, wherein the plurality of conductive layers further comprise copper layers, wherein the copper layers are used as windings in the magnetic device.

7. The magnetic device of claim 1, wherein the two or more spacers include a metallic conductor.

8. The magnetic device of claim 5, wherein the low magnetic reluctance material includes a ferrite core.

* * * * *